Aug. 24, 1937.  C. A. LEE  2,090,687
BELT DRESSING AND METHOD OF PREPARING SAME
Filed April 18, 1936
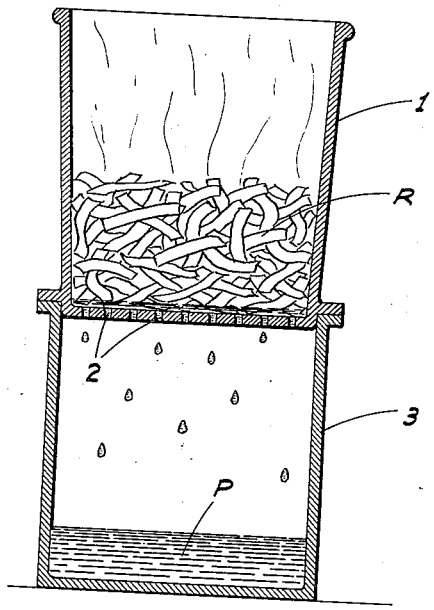
INVENTOR
C.A.Lee
BY
ATTORNEY Patented Aug. 24, 1937

2,090,687

UNITED STATES PATENT OFFICE 2,090,687

BELT DRESSING AND METHOD OF PREPARING SAME

Chauncey A. Lee, Lodi, Calif.

Application April 18, 1936, Serial No. 75,128

5 Claims. (Cl. 134—17)

This invention relates generally to a dressing for drive belts such as are commonly used to operate various types of machinery, the invention being directed in particular to, and it is my principal object to provide a belt dressing which will effectively prevent a belt from slipping relative to the drive pulleys and will cause the pulleys to grip the belt and assure proper driving thereof.

Another object of my invention is to provide a belt dressing for the purpose described which will not dry out with use and which will continue to provide the necessary grip between a belt and its drive pulleys for a relatively long period of time.

An additional object of my invention is to provide a novel method of preparing the belt dressing so that a very inexpensive product is obtained.

A further object of the invention is to produce a simple and inexpensive device to prepare the belt dressing and yet one which will be exceedingly effective for the purpose for which it is designed.

These objects I accomplish by means of such structure and relative arrangement of parts as will fully appear by the perusal of the following specifications and claims.

The figure of the drawing is a diagrammatic sectional elevation of the device I employ to prepare the belt dressing.

Referring now more particularly to the characters of reference on the drawing, my improved belt dressing is prepared from rubber in the following manner:

I first take a quantity of rubber, preferably used automobile inner tubes, and cut the same into strips or pieces which are then placed in a container 1. These rubber strips or pieces indicated as R are then ignited by any suitable means and as the ignited strips begin to burn a relatively high heat is created causing the major proportion of the rubber to melt into a liquid.

This liquid drips thru relatively small openings 2, in the bottom of the container 1, into a lower container 3 which is arranged relative to the upper container 1 so as to have an air tight fit at the point of engagement therewith.

The burning and melting rubber R in the container must be stirred continuously and as this is done, the melted liquid rubber which drips thru opening 2 may be in flame and burning. However, due to the fact that openings 2 are relatively small and that the lower container 3 is substantially air-tight, the burning melted rubber is extinguished as it drips thru the openings into the lower container.

The resultant product P which accumulates in the lower container not only comprises the melted portion of the rubber but also includes all the solids, such as ashes, etc., resulting from the combustion or burning of the rubber.

This resultant product is an extremely viscous and sticky liquid. When prepared from "red" rubber inner tubes which apparently produce the best belt dressing, the product is the color of burnt sienna; a distinctive color which makes the belt dressing well suited for sale in glass containers if desired.

When this viscous and sticky belt dressing is applied on a belt, it is practically impossible to skid or slip the belt on the pulleys. After being reduced to a semi-liquid state, the product does not again harden or dry out and therefore when applied to a belt it provides an effective dressing for an indefinite period of time.

It may here be noted that the ignition of the rubber may be effected by direct engagement with a flame, or by the application of a heat to the container 1 sufficient to cause ignition or melting of the rubber therein.

From the foregoing description it will be readily seen that I have produced such a product and device for preparing the same as substantially fulfills the objects of the invention as set forth herein.

While this specification sets forth in detail the present and preferred construction of the device by which the product is prepared, still in practice such deviations from such detail may be resorted to as do not form a departure from the spirit of the invention, as defined by the appended claims.

Having thus described my invention, what I claim as new and useful and desire to secure by Letters Patent is:

1. That method of preparing a belt dressing comprising the steps of causing combustion of a quantity of rubber to cause it to burn and melt and then accumulating the liquid product resulting from the burning of a portion of the rubber.

2. That method of preparing a belt dressing comprising the steps of causing combustion of a quantity of rubber to cause it to burn and melt and then accumulating the resulting liquid rubber while at the same time preventing the free access of air to such accumulating liquid whereby to prevent the continued burning thereof.

3. That method of preparing a belt dressing comprising the steps of causing combustion of a quantity of rubber to cause it to burn and melt obtained from used inner tubes, and accumulating the resultant melted rubber along with the solid products of combustion, all in a homogenuous viscous liquid.

4. That method of preparing a belt dressing comprising the steps of causing combustion of a quantity of rubber to cause it to burn and melt, continuously stirring said burning rubber and accumulating the resultant melted rubber along with the solid products of combustion, all in a homogenuous viscous liquid.

5. That method of preparing a belt dressing from rubber comprising the steps of causing combustion of the rubber to cause it to burn and melt, accumulating the melted rubber as it is still burning and immediately extinguishing the accumulated rubber.

CHAUNCEY A. LEE.